July 17, 1962 C. D. POTT 3,044,442
APPARATUS FOR APPLYING COATINGS TO SURFACES OF ARTICLES
Filed Feb. 26, 1959 2 Sheets-Sheet 2
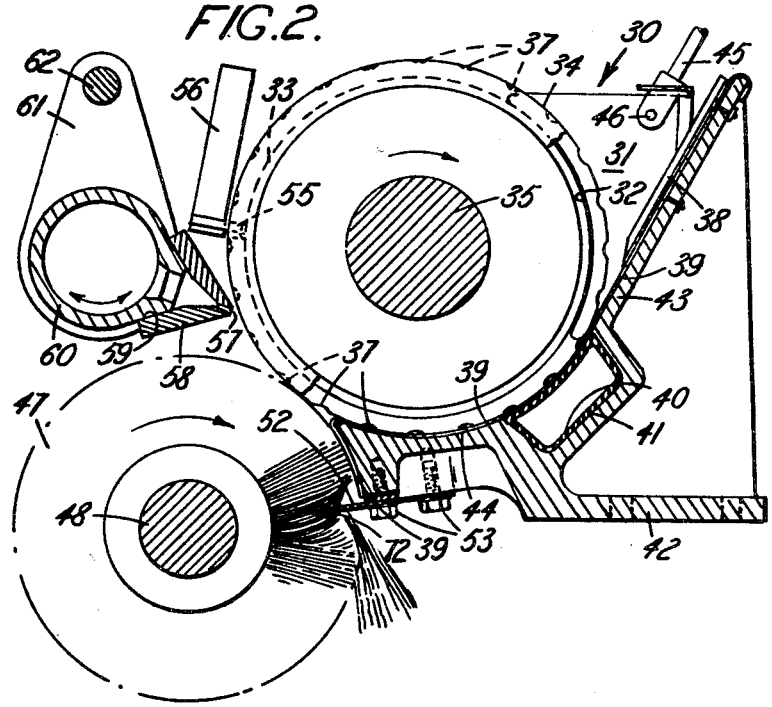
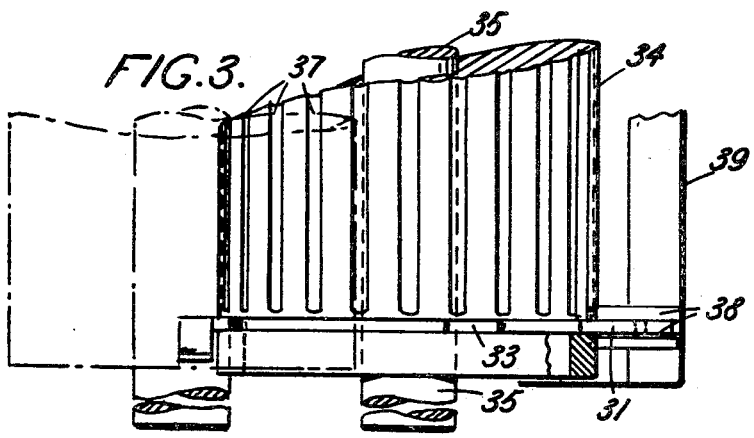
INVENTOR
Cyrus Dennis Pott
by
Watson, Cole, Grindle & Watson
ATTORNEYS United States Patent Office 3,044,442
Patented July 17, 1962

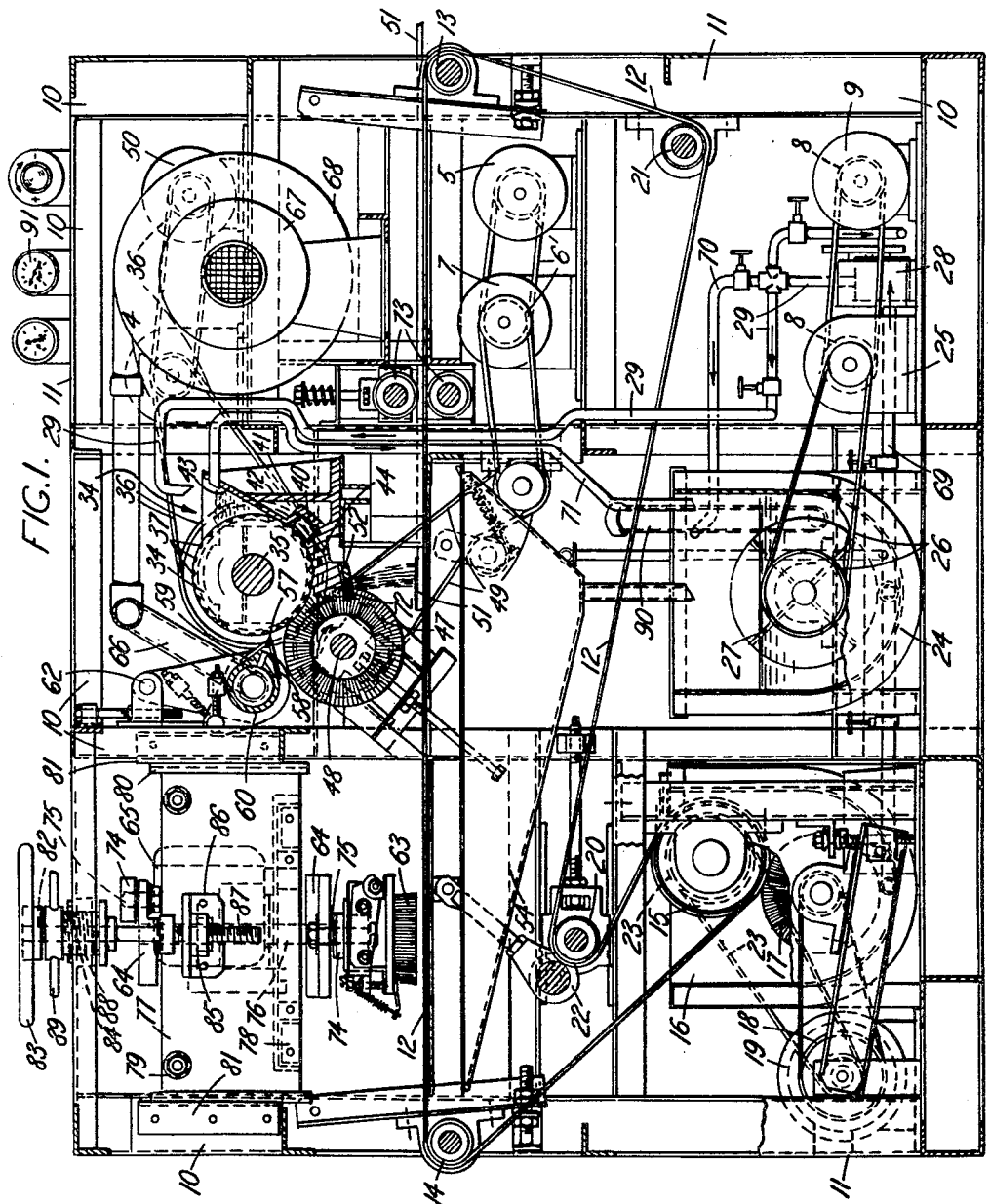

3,044,442
APPARATUS FOR APPLYING COATINGS TO SURFACES OF ARTICLES
Cyrus Dennis Pott, Halfway Green, Walton-on-Thames, England
Filed Feb. 26, 1959, Ser. No. 795,651
Claims priority, application Great Britain Mar. 3, 1958
10 Claims. (Cl. 118—602)

This invention relates to apparatus for applying a coating of a flowable substance to surfaces of articles particularly sheet material and has for an object to ensure that the coating is of uniform thickness over the whole area of the article.

According to this invention an apparatus for applying a coating of flowable substance to a surface of an article comprises a support for the article, a metering feed roller disposed away from the support with its axis parallel to the surface of the article when on said support means for rotating said roller means for effecting relative movement between the roller and support in a direction along the length of the latter and transverse to the axis of rotation of the roller, feed means for the flowable substance extending along the length of the feed roller and having an extension on the leading side thereof with respect to the direction of rotation of the roller and disposed close to the surface of the roller around a part of its circumference so as to spread and retain a predetermined quantity of the flowable substance on said surface until it passes beyond the leading edge of said extension.

Preferably the surface of the metering roller is formed with a number of isolated pockets of predetermined capacity and said extension of the feed means is arranged to make a wiping contact with said surface so as to confine the flowable material to the pockets only.

The isolated pockets may comprise a number of axially extending circumferentially spaced grooves on said surface of the metering roller.

Preferably means are provided beyond said extension for projecting the flowable substance from the roller in a direction towards the article on the support.

Preferably the means for rotating the metering roller comprises a motor which drives the roller through a variable speed gear and a speed indicator is associated with said roller.

The axis of rotation of the metering feed roller may be fixed and the support movable, for example, the support may comprise an endless belt conveyor.

In one construction according to the invention the said feed means comprise a hopper extending along the length of the metering roller and a flexible apron is arranged partly to encircle the roller and resilient means are arranged to bear on the apron pressing it evenly on to the surface of the roller.

The aforesaid resilient means for evenly pressing the apron on to said drum may comprise a pneumatic bag.

The aforesaid apron may be formed from thin sheet steel.

The hopper may comprise two end walls sliding into two guide channels attached to the apron and which side walls may have concavely curved edges which engage circumferential grooves in the drum so as to form a seal.

The flexible apron may be supported by a suitably shaped backing member having a channel formed therein for accommodating the aforesaid inflatable bag which extends along the length of the roller.

The aforesaid means for projecting the flowable material from the surface from the roller may comprise a cylindrical bristle brush arranged to rotate about an axis parallel with that of the roller and which bristles engage the surface of the roller so as to sweep the flowable substance from the grooves and which brush is disposed between the roller and said support.

Other features of the invention are set out in the accompanying claims and the following description of an apparatus for applying a fire proofing composition to soft board reference being made to the accompanying drawings in which:

FIGURE 1 is a diagrammatic side elevation of the apparatus;

FIGURE 2 is an enlarged and more detailed view of that part of FIGURE 1 comprising the means for applying the fire proofing composition; and FIGURE 3 is a plan view of a part of the metering roller shown in FIGURE 2.

The various parts of the apparatus are supported on a framework 10 enclosed within the walls of a cabinet 11. An endless belt conveyor 12 is provided with a horizontal stretch extending between two supporting rollers 13 and 14 supported by shafts mounted in suitable bearings on the outside of the end walls of the cabinet. One stretch of the belt conveyor extends downwardly into the cabinet and around the underside of a roller 15 so that it dips into cleaning liquid in a tank 16. A rotary cleaning brush 17 is located within the tank so as to wipe across the outer face of the conveyor which brush is driven through a chain and sprocket transmission 18 from a motor 19. As the belt 12 leaves the tank it may be further cleaned by a squeegee roller 22. The endless conveyor then extends upwardly over a roller 20 and along to another roller 21 and then to the roller 13. The roller 15 is driven by the motor 19 through a chain and sprocket transmission 23. The fire proofing material is supplied to a mixing tank 24 disposed at the bottom of the cabinet and having a filler pipe 90 connected to a removable filling hopper (not shown) beyond one side of the cabinet so as to enable it to be readily replenished and which hopper is provided with a removable filter. A paddle wheel 27 is disposed within the tank and is driven by a chain and sprocket transmission 26 from a gear box 25 which in its turn is driven from a motor 9 through a chain and sprocket transmission 8. A pump 28 driven from the gear box 25 delivers the fire proofing composition through conduits 29 to a feed trough 30 mounted across the top of the framework 10. The pump receives the composition from the mixing tank 24 through the pipe 69. The outlet from the pump can be by-passed through the pipe 70 back again into the mixing tank. An overflow pipe 71 extends from the feed trough 30 back again to mixing tank. The various pipes are controlled by suitable cocks as shown.

Thus the liquid in the feed trough 30 may always be kept at a constant head.

The feed trough comprises two end plates 31 (only one of which appears in the drawings) having arcuate edges 32 which project respectively into two circumferential grooves 33 at the ends of a metering roller 34 so as to make a good fit therewith. The roller is fashioned from a material which is resistant to acids and is fixed to a shaft 35 supported by bearings on the framework and which roller is driven through a chain and sprocket transmission 36 (see FIGURE 1) and a variable speed gear box 4 by a motor 50 also supported by the framework. The surface of the roller is provided with a number of axially extending circumferentially spaced shallow grooves 37 which stop short of the circumferential grooves 33. Extending along the outer edges of the hopper end plates 31 are guide channels 38 (see FIGURES 2 and 3). A flexible steel apron 39 which projects below the lower ends of the end plates 31 and is disposed opposite an inflatable bag 40 disposed within a recess 41 in a backing member 42. The backing member extends upwardly at 43 above the inflatable bag and serves to support an upper part of the apron 39 and also extends downwardly and beneath the roller at 44 in close proximity thereto. The side plates 31 are so movably mounted as a unit that they bed down between the gooves 33 and guide channels 38 and this may be effected by an adjusting rod 45 pivotally connected to the side plates 31 by means of a pin 46. This arrangement ensures that the fire proofing material, which is of a creamy consistency cannot spill over at the ends of the trough 30 and is evenly laid along the axial grooves 37 of the roller 34.

In order to ensure that a predetermined quantity of proofing material is applied to the boards per unit area a tachometer 91 is associated and driven by the roller 34 which may be calibrated with a scale indicating revolutions per minute and/or with a number of scales representing cubic centimetres per square metre for different conveyor speeds and the required amount is obtained by adjusting the variable speed gear box.

Disposed beneath and to one side of the roller 34 is a rotary distributing brush 47 fixed to a shaft 48 driven through a chain and sprocket transmission 49, gear box 7, transmission 6, by a motor 5.

The distributing brush 47 is disposed above the horizontal stretch of endless conveyor belt 12 which supports the boards 51 to be treated and passes between feed rollers 73. The pipe proofing material is splattered in the form of globules on to the board by a blade 52 which is secured to the part 44 by screws 53 so as to project into the path of travel of the bristles of the brush. Under the blade 52 is secured a stationary brush 72 the function of which is to prevent drips falling from the blade. Any of the material oozing and dripping from the edges of the boards is collected by two waste recovery troughs 54 mounted on the framework 10 beneath the edges of the horizontal stretch of the conveyor and which in their turn delivers the material into the mixing tank 24.

A certain amount of the fire proofing material may collect in the circumferential grooves 33 (FIGURE 2) in the roller and this is removed by fingers 55 which project into the grooves at a location above the distributor brush and thus the removed material is delivered on to the brush and distributed on to the board.

The fingers are attached to a structure 56 so mounted on the framework 10 as to be movable towards and away from the roller. Any of the material adhering to the roller 34 in spite of the brushing operation is removed by a jet of compressed air extending across the width of the roller above the brush and issuing from a narrow gap 57 between two plates 58 which converge towards one another and are mounted on converging walls 59 projecting from one side of a pipe 60 connected by piping 66 to a blower 68 driven by a motor 67. The pipe is carried by a structure 61 so pivotally mounted at 62 on the framework so that it can be swung towards and away from the roller for which purpose a portion of the piping requires to be flexible. It is sometimes desirable for increased decorative effect to impart a brushing or smoothing action so the globules of fire resisting material coalesce after being deposited on the board. To achieve this the board is moved by the endless conveyor past a smoothing device after leaving the distributor brush 47. The smoothing device comprises a brush 63 mounted to move bodily in a circle about an upright axis.

The brush 63 is fixed to a connecting rod 74 connecting together two crank pins 75 (only one of which is shown in the drawings) on two horizontal crank discs 64 at the lower ends of two upright shafts 76 spaced apart across the width of the endless belt 12. The upper ends of the shafts may likewise be provided with crank discs 64 and pins 75 connected by a connecting rod 74. The crank shafts are mounted on a framework comprising two plates 77 secured together by the framework and tie rods 78 and clamping nuts 79. The plates are provided with slides 80 which can move along the slideways 81 secured to the uprights 10 of the main frame. A nut portion 85 secured by brackets 86 to the side plates is engaged by a lead screw 87 fixed to a hand wheel 83 so that by rotating the hand wheel the assemblage may be moved up and down. Slight relative tilting movement may be provided between two plates 77 in an up and down direction which is effected by a second lead screw 84 which engages a nut portion 88 fixed to a second hand wheel 89 whereby the assemblage may be tilted and the face of the brush 63 brought into the required parallel relationship with the board to which the material has been applied.

I claim:

1. An apparatus for applying a continuous coating of flowable adherent substance to a surface of an article comprising a support for the article, a metering feed roller having a number of isolated closed bottom pockets of predetermined capacity uniformly distributed over its surface which roller is arranged with its axis of rotation parallel to the surface of said support, means for rotating said roller, means for effecting relative movement between the roller and support in the direction of the length of the support substantially at right angles to the fixed axis of rotation of the roller, a horizontal feed hopper extending along the length of the roller so that the roller forms a wall of the hopper which hopper has an extension on the underside thereof and in contact with a part of the surface of the roller confining the flowable substance to said pockets and leaving the surface between the pockets substantially free of said substance, and means beyond said extension for removing the substance from said pocket and projecting it on to the articles on the support, said extension of said hopper comprising a flexible apron which is arranged to extend from the hopper so as partly to encircle the roller and wherein resilient means are arranged to bear on the apron pressing it evenly on to the surface of the roller.

2. An apparatus according to claim 1 wherein said resilient means comprise a pneumatic inflatable bag.

3. An apparatus according to claim 2 wherein said flexible apron is supported by a shaped backing member having a channel formed therein for accommodating said inflatable bag which extends along the length of the roller.

4. An apparatus according to claim 1 wherein said flexible apron comprises thin sheet steel.

5. An apparatus according to claim 1 wherein the means for projecting the flowable material from the surfaces of the roller comprises a cylindrical bristle brush arranged to rotate about an axis parallel with that of the roller and which bristles project into the mouths of the pockets so as to sweep around the closed bottoms and force the flowable substance therefrom, wherein a blade associated with said apron is arranged to project into the path of travel of the bristles.

6. An apparatus according to claim 1 wherein the means for projecting the flowable material from the surfaces of the roller comprises a cylindrical bristle brush arranged to rotate about an axis parallel with that of the roller and which bristles project into the mouths of the pockets so as to sweep around the closed bottoms and force the flowable substance therefrom, wherein a blade associated with said apron arranged to project into the path of travel of the bristles and wherein an auxiliary brush is fixed to said blade for preventing drips being formed thereby.

7. An apparatus for applying a continuous coating of flowable adherent substance to a surface of an article comprising a support for the article, a metering feed roller having a number of isolated closed bottom pockets of predetermined capacity uniformly distributed over its surface which roller is arranged with its axis of rotation parallel to the surface of said support, means for rotating said roller, means for effecting relative movement between the roller and support in the direction of the length of the support substantially at right angles to the fixed axis of rotation of the roller, a horizontal feed hopper extending along the length of the roller so that the roller forms a wall of the hopper which hopper has an extension on the underside thereof and in contact with a part of the surface of the roller confining the flowable substance to said pockets and leaving the surface between the pockets substantially free of said substance, and means beyond said extension for removing the substance from said pocket and projecting it on to the articles on the support, said extension comprising a flexible apron, circumferential grooves formed in the roller near the ends thereof, and said hopper comprising two end walls joined to the side edges of the apron and which side walls have concavely curved edges which also engage circumferential grooves in the drum so as to form a seal.

8. An apparatus for applying a continuous coating of flowable adherent substance to a surface of an article comprising a support for the article, a metering feed roller having a number of isolated closed bottom pockets of predetermined capacity uniformly distributed over its surface which roller is arranged with its axis of rotation parallel to the surface of said support, means for rotating said roller, means for effecting relative movement between the roller and support in the direction of the length of the support substantially at right angles to the fixed axis of rotation of the roller, a horizontal feed hopper extending along the length of the roller so that the roller forms a wall of the hopper which hopper has an extension on the underside thereof and in contact with a part of the surface of the roller confining the flowable substance to said pockets and leaving the surface between the pockets substantially free of said substance, and means beyond said extension for removing the substance from said pocket and projecting it on to the articles on the support, an air nozzle having a slot directed towards and along the length of the roller, said nozzle being supplied with compressed air and located opposite that part of the metering roller which is moving away from the means for removing the substance from said pockets.

9. An apparatus for applying a continuous coating of flowable adherent substance to a surface of an article comprising a support for the article, a metering feed roller having a number of isolated closed bottom pockets of predetermined capacity uniformly distributed over its surface which roller is arranged with its axis of rotation parallel to the surface of said support, means for rotating said roller, means for effecting relative movement between the roller and support in the direction of the length of the support substantially at right angles to the fixed axis of rotation of the roller, a horizontal feed hopper extending along the length of the roller so that the roller forms a wall of the hopper which hopper has an extension on the underside thereof and in contact with a part of the surface of the roller confining the flowable substance to said pockets and leaving the surface between the pockets substantially free of said substance, and means beyond said extension for removing the substance from said pocket and projecting it on to the articles on the support, said roller being provided with circumferential grooves near the ends thereof and said hopper having end walls projecting into said grooves and fingers arranged to project into the circumferential grooves of the roller away from the end walls of the hopper.

10. An apparatus for applying a continuous coating of flowable adherent substance to a surface of an article comprising a support for the article, a metering feed roller having a number of isolated closed bottom pockets of predetermined capacity uniformly distributed over its surface which roller is arranged with its axis of rotation parallel to the surface of said support, means for rotating said roller, means for effecting relative movement between the roller and support in the direction of the length of the support substantially at right angles to the fixed axis of rotation of the roller, a horizontal feed hopper extending along the length of the roller so that the roller forms a wall of the hopper which hopper has an extension on the underside thereof and in contact with a part of the surface of the roller confining the flowable substance to said pockets and leaving the surface between the pockets substantially free of said substance, and means beyond said extension for removing the substance from said pocket and projecting it on to the articles on the support, there is being provided a circulating tank for the coating material which is provided with a motor driven mixing device and a pump for feeding the coating material from the mixing tank to said hopper and back again to the tank.

References Cited in the file of this patent

UNITED STATES PATENTS

| Number | Name | Date |
|---|---|---|
| 169,268 | Isbell | Oct. 26, 1875 |
| 598,608 | Clark | Feb. 8, 1898 |
| 634,171 | Holt | Oct. 3, 1899 |
| 1,191,537 | Schall | July 18, 1916 |
| 1,686,968 | Harber | Oct. 9, 1928 |
| 1,979,758 | Merritt | Nov. 6, 1934 |
| 2,009,652 | Conwill | July 30, 1935 |
| 2,116,289 | Shepherd | May 3, 1938 |
| 2,135,406 | MacDonald | Nov. 1, 1938 |
| 2,206,056 | Sheesley | July 2, 1940 |
| 2,348,817 | Irvine | May 16, 1944 |
| 2,380,047 | Hyman | July 10, 1945 |
| 2,397,853 | Gist | Apr. 2, 1946 |
| 2,510,658 | Rassman | June 6, 1950 |
| 2,787,244 | Hicken | Apr. 2, 1957 |
| 2,876,039 | Vogdt | Mar. 3, 1959 |

FOREIGN PATENTS

| 507,012 | Great Britain | June 7, 1939 |